May 27, 1969  C. RÖNNEVIG  3,447,002
ROTATING ELECTRICAL MACHINE WITH LIQUID-COOLED
LAMINATED STATOR CORE
Filed Feb. 28, 1966

INVENTOR.
CARL RÖNNEVIG
BY
Bailey, Stephens & Huettig
ATTORNEYS

3,447,002
ROTATING ELECTRICAL MACHINE WITH LIQUID-COOLED LAMINATED STATOR CORE

Carl Rönnevig, Vasteras, Sweden, assignor to Allmänna Svenska Elektriska Aktiebolaget, Vasteras, Sweden, a Swedish corporation
Filed Feb. 28, 1966, Ser. No. 530,688
Claims priority, application Sweden, Mar. 17, 1965, 3,437/65
Int. Cl. H02k 9/20
U.S. Cl. 310—54                                                7 Claims

ABSTRACT OF THE DISCLOSURE

A stator core is provided with a plurality of annular grooves, in which are located heat-conducting bodies arranged tangentially one after the other in each groove, with cooling tubes embedded in the cooling bodies

---

Figure 1:
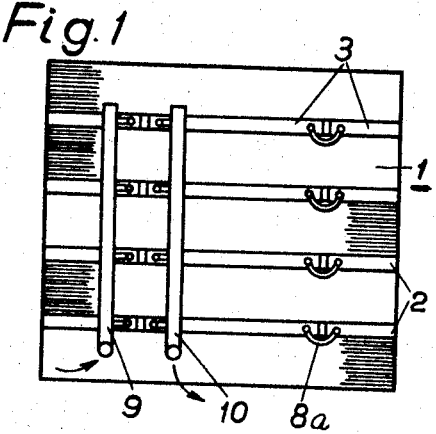

The present invention relates to a rotating electrical machine with a water-cooled laminated stator core and more precisely a high power synchronous generator. In order to achieve as good a utilisation of the material as possible, such machines are often made with direct-cooled armature windings. The armature winding is supported by a laminated stator core. It has been proved with such machines to be advantageous to provide the stator with a special cooling system for cooling the stator core iron. In known machines such a cooling system has been effected by providing the stator core with through-going axially oriented cooling tubes, through which a liquid coolant passes. The cooling tubes must then be provided with a solid, electrical insulation, which involves certain structural complications and besides reduces the transfer of heat between the rotor iron and the cooling tube. It is further known to effect water-cooling of the stator plate unit by making the stator core with groups of stator laminations arranged axially one after the other—in a similar way to that with air-cooled stators—whereas the intermediate space between the groups, which in air-cooled machines forms channels for the air flowing through, is occupied by cooling elements in the form of flat boxes intended for the circulating liquid coolant. The boxes are welded together by sheet metal and also serve as spacer elements between said groups of laminations. Even if the welding is carried out with the greatest precision, this construction does not give sufficient operational safety. A small fault during the welding or a leak caused by corrosion in the joint between the weld and the plate is sufficient to put the machine out of operation and since water-cooled stator cores are mainly concerned with machines of the size of 100 mw. or more, it is thus large amounts which can be lost.

With another known construction where the stator core is divided into separate lamination groups arranged axially one after the other, a plurality of cooling tubes is arranged in the intermediate space between the groups. Not even this construction gives the necessary high security against leaks in the inaccessible part of the cooling system of the stator core, since welding errors in this part can hardly be avoided. Further the tubes are subjected to alternating repetition of stress due to their function as distance elements and because the compressing force exerted on the stack of laminations varies with the temperature. If sufficient heat transfer surface between the cooling tubes and the core is to be provided, the tube consumption will be relatively great, which considerably increases the cost of the machine, which is still more evident if the facts that the tube should have a rectangular cross section and must be made of the highest quality material are taken into account. The construction must be made with great precision and thus is very time-consuming. There are also certain difficulties involved in obtaining a sufficiently even distribution of the compressing force on adjacent parts of the tubes, so there is the danger of certain parts having an unallowably large freedom of movement and thereby giving rise to disturbing noises.

Figure 2:
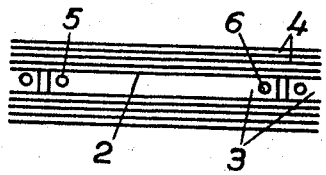
Figure 3:
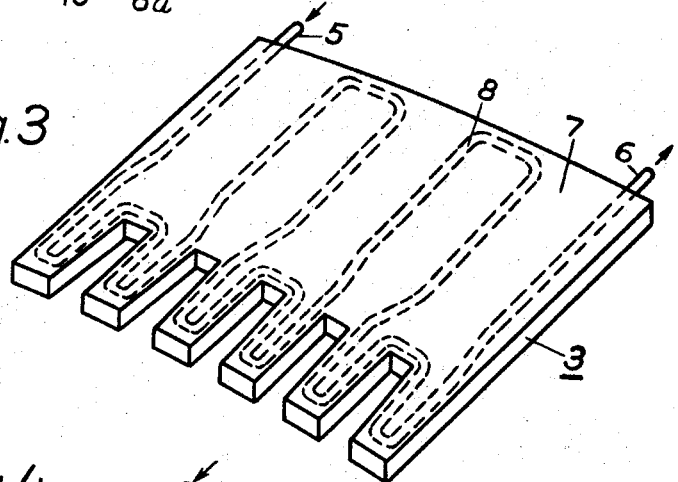
Figure 4:
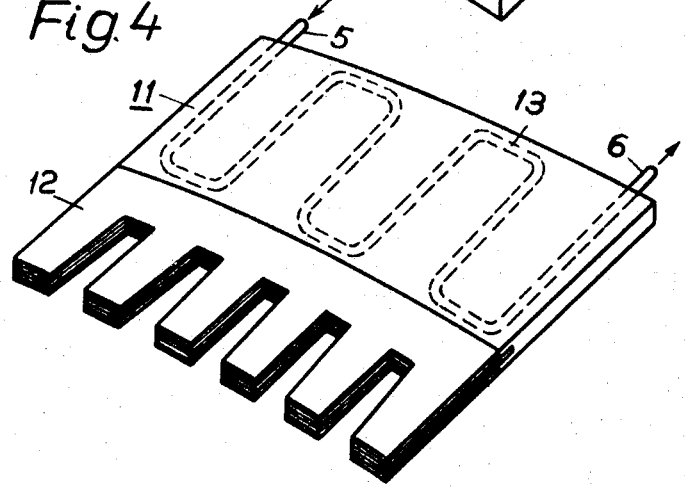

These disadvantages are avoided by the present invention which relates to a rotating electrical machine with a liquid-cooled laminated stator core, which is made with a plurality of grooves arranged axially one after the other and perpendicular to the machine shaft, the grooves each comprising at least one cooling element prvided with a hollow space, said element being arranged with at least the main part of its surface in contact with the limiting surfaces of the groove and provided with inlet and outlet openings intended for a liquid coolant, characterised in that the cooling element is composed of a cast body of a material with good heat conducting properties and at least one metal tube embedded in said body and constituting a cooling channel. In the following the invention will be described with reference to the accompanying drawings, where FIG. 1 shows a side view of a stator core for a machine according to the invention and FIG. 2 a detail of FIG. 1. FIGS. 3 and 4 show in perspective two different embodiments of a cooling element according to the invention.

On the drawing, 1 denotes a laminated stator core which is divided into five parts arranged axially one after the other by means of four ring-shaped grooves, which are each limited in the axial direction by the laminations 4 of the stator core. Each groove 2 contains a plurality of cooling elements 3 arranged in tangential direction one after the other, which elements are each substantially formed as an annular sector and made as a flat aluminum body embedding a sinuous tube 8 cast in this body, which tube is provided with an inlet opening 5 and an outlet opening 6 intended for a liquid coolant, for example water. The tubes in successive cooling bodies may be connected in series by connections 8a.

The cooling element shown in FIG. 3 is formed substantially with the same radial dimensions as the stator core and has the same inner contours.

Instead of the above mentioned embodiment the arrangement shown in FIG. 4 may be used, where the cooling element itself is only intended to extend over part of the radial core thickness and thus is constructed with a smaller radial dimension than that shown in FIG. 3. Thus the advantage is achieved that the cooling elements do not take up space in the stator parts, where the flux density is highest. Such a cooling element is denoted by 11 in FIG. 4, and 12 denotes a part of the stator core lying radially inside the element 11. The core part 12 is composed of laminations insulated from each other and glued to each other and provided with slots and teeth of the same dimensions as the rest of the stator core. The cooling body 11, which is arranged in good heat-conducting contact with the core part 12, is cast in aluminum and has embedded a cooling coil in the form of a bent metal tube 13. Instead of using just one cooling tube, in certain cases it can be necessary to construct the cooling body with a plurality of tubes, which are connected in parallel with regard to the flow of liquid through the cooling element.

With a cooling element according to the invention a double security against leakage is achieved. If the embedded tube should have a material fault somewhere, there is very little likelihood that a casting fault would occur at the same place in the surrounding metal body.

I claim:
1. A liquid-cooled laminated stator core structure, having a plurality of annular grooves arranged axially one after the other, the grooves each containing a plurality of cooling elements arranged tangentially one after the other, each element comprising a flat body of a material having high thermal conductivity and a metallic cooling tube embedded in said body constituting a circuit for a cooling liquid, the ends of said tube extending outside said body to provide inlet and outlet openings respectively for said cooling liquid.

2. Stator core structure according to claim 1, said cast body having embedded therein a plurality of metal tubes which are connected in parallel for the flow of coolant through the element.

3. Stator core structure according to claim 1, that said grooves being ring-shaped.

4. Stator core structure according to claim 3, a plurality of cooling elements arranged in the same groove being series connected for the flow of the coolant.

5. Stator core structure according to claim 1, the grooves extending through the stator core and said cooling element having a plurality of projections directed radially inwards, which each lie between tooth parts of the core following axially one after the other.

6. Stator core structure according to claim 1, said grooves being limited radially inwards by a laminated stator core part provided with slots and teeth.

7. Stator core structure according to claim 6, the laminations in said stator core part being glued together.

References Cited

FOREIGN PATENTS 883,827  12/1961  Great Britain.

WARREN E. RAY, *Primary Examiner.*

R. SKUDY, *Assistant Examiner.*

U.S. Cl. X.R.

310—65